(12) United States Patent
Heidrich et al.

(10) Patent No.: US 10,277,020 B2
(45) Date of Patent: Apr. 30, 2019

(54) LEADTHROUGH DEVICE AND BUILDING WITH A LEADTHROUGH DEVICE

(71) Applicant: SIEMENS AKTIENGESELLSCHAFT, Munich (DE)

(72) Inventors: Dieter Heidrich, Langenselbold (DE); Achim Von Seck, Roettenbach (DE); Faidon Sachsamanoglou, Erlangen (DE); Antonios Kopanoudis, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/964,504

(22) Filed: Apr. 27, 2018

(65) Prior Publication Data
US 2018/0316169 A1    Nov. 1, 2018

(30) Foreign Application Priority Data
Apr. 27, 2017    (DE) .......................... 10 2017 207 095

(51) Int. Cl.
| | |
|---|---|
| H02G 3/22 | (2006.01) |
| H02G 3/18 | (2006.01) |
| H02G 3/00 | (2006.01) |
| F16F 15/06 | (2006.01) |
| F16L 5/02 | (2006.01) |
| H02B 1/54 | (2006.01) |

(52) U.S. Cl.
CPC .............. H02G 3/22 (2013.01); F16F 15/06 (2013.01); H02G 3/263 (2013.01); F16L 5/025 (2013.01); H02B 1/54 (2013.01)

(58) Field of Classification Search
CPC .. H02G 3/18; H02G 3/22; H02G 3/24; H02G 3/26; H02G 3/30; H02G 3/36; H02G 15/007; H02G 3/083; H02G 3/263; H01R 43/20; B60R 16/0222; B60R 16/0215
USPC ...... 174/650, 152 G, 153 G, 72 A, 151, 135, 174/480, 654, 659, 660, 668, 505; 16/2.1, 2.2; 248/56, 68.1
See application file for complete search history.

(56) References Cited

U.S. PATENT DOCUMENTS

| | | | | |
|---|---|---|---|---|
| 5,442,140 A | * | 8/1995 | McGrane | H02G 3/22 174/151 |
| 7,005,579 B2 | * | 2/2006 | Beele | H02G 3/22 16/2.1 |
| 7,262,372 B2 | * | 8/2007 | Ickert | H02G 3/22 16/2.1 |
| 7,288,730 B2 | * | 10/2007 | Habel | H02G 3/22 16/2.1 |

(Continued)

FOREIGN PATENT DOCUMENTS

| | | |
|---|---|---|
| CA | 1190620 A | 7/1985 |
| DE | 1949270 U | 11/1966 |

(Continued)

*Primary Examiner* — Angel R Estrada
(74) *Attorney, Agent, or Firm* — Laurence Greenberg; Werner Stemer; Ralph Locher (57) ABSTRACT

A leadthrough device holds a conduit in a wall opening of a wall, in particular building wall; and guides the conduit through the wall. The leadthrough device has a holding element with a passage hole, through which the conduit can be led, and has an outer frame. The holding element is resiliently held in the frame interior by at least one spring device.

16 Claims, 5 Drawing Sheets

(56) References Cited

U.S. PATENT DOCUMENTS

| | | | | |
|---|---|---|---|---|
| 7,511,220 B2* | 3/2009 | Pawlowski | .......... | H02G 3/0468 |
| | | | | 174/74 R |
| 8,294,030 B2* | 10/2012 | Pollard, Jr. | .............. | H02G 3/30 |
| | | | | 174/650 |
| 8,314,337 B2* | 11/2012 | Fujita | ....................... | H02G 3/22 |
| | | | | 248/56 |
| 8,963,010 B2* | 2/2015 | Sprenger | ................ | H02G 3/083 |
| | | | | 174/650 |
| 9,000,299 B2* | 4/2015 | Ruth | ....................... | H02G 3/32 |
| | | | | 174/72 A |
| 9,350,152 B2* | 5/2016 | Andresen | ............... | H02G 3/085 |

FOREIGN PATENT DOCUMENTS

| | | | |
|---|---|---|---|
| DE | 3211089 | A1 | 10/1982 |
| KR | 101415085 | B1 | 7/2014 |
| KR | 101620065 | B1 | 5/2016 |

\* cited by examiner

LEADTHROUGH DEVICE AND BUILDING
WITH A LEADTHROUGH DEVICE

CROSS-REFERENCE TO RELATED
APPLICATION

This application claims the priority, under 35 U.S.C. § 119, of German patent application DE 10 2017 207 095.1, filed Apr. 27, 2017; the prior application is herewith incorporated by reference in its entirety.

BACKGROUND OF THE INVENTION

Field of the Invention

The invention relates to a leadthrough device for holding a conduit, in particular an electrical conduit, in a wall opening of a wall, in particular building wall.

The invention is based on the object of specifying a leadthrough device which, even in the event of a relative movement between wall and conduit, for example in the event of an earthquake, reliably holds the conduit.

BRIEF SUMMARY OF THE INVENTION

It is accordingly an object of the invention to provide a leadthrough which overcomes a variety of disadvantages of the heretofore-known devices and methods and which provides for such a reliable leadthrough.

With the foregoing and other objects in view there is provided, in accordance with the invention, a leadthrough device for holding a conduit in a wall opening of a wall, in particular a building wall. The leadthrough device comprises:

a holding element formed with a passage hole for guiding the conduit therethrough;

an outer frame having a frame interior; and at least one spring device disposed to resiliently hold said holding element in said frame interior of said outer frame.

In other words, the objects of the invention are achieved in that the leadthrough device has a holding element with a passage hole, through which the conduit can be led, and has an outer frame, in the frame interior of which the holding element is held in resilient fashion by means of at least one spring device.

A major advantage of the leadthrough device according to the invention can be seen in the fact that the conduit is held resiliently within the frame, such that relative movements between conduit and frame can be absorbed by the at least one spring device.

The leadthrough device is preferably suitable for the leadthrough of an electrical conduit.

It is advantageous if two adjacent spring devices of the leadthrough device form a connection unit, in which the two spring devices are fastened in each case by means of their first end to the holding element and by means of their second end to the frame.

The angle between the longitudinal directions of the two adjacent spring devices of the connection unit preferably lies between 40° and 50°, and is particularly preferably 45°. By means of such an angular configuration, a very large range of mobility of the holding element within the outer frame is realized in a particularly simple manner.

The spring devices are preferably spring devices which are resilient axially along their longitudinal direction. It is particularly advantageous if the spring devices are annular springs.

With regard to the relative arrangement of the two adjacent spring devices in the one or more connection units, it is considered to be advantageous if the two first ends are spaced apart from one another and define a first distance, and the two second ends are spaced apart from one another and define a second distance, and the angle between the direction vectors of the two distances lies between 80° and 110°.

The angle between the direction vectors that define the direction of the two distances is particularly preferably 90 degrees.

The first distance preferably extends in the frame plane of the frame or parallel to the plane defined by the frame. The second distance is preferably perpendicular to the frame plane of the frame.

It is also advantageous if the holding element is, at at least one edge, fastened to the frame by means of two or more connection units arranged spaced apart from one another.

It is particularly advantageous if the holding element is fastened at at least two opposite edges to the frame, in each case by means of two or more connection units arranged spaced apart from one another, and the passage hole is situated between the two opposite edges.

In a first particularly preferred embodiment, it is provided that the holding element is fastened at two mutually opposite edges, hereinafter referred to as first and second edges, to the frame, in each case by means of two or at least two connection units arranged spaced apart from one another, and the holding element is fastened at two further mutually opposite edges, hereinafter referred to as third and fourth edges, to the frame, in each case by means of a, in particular one single, spring device.

It is advantageous if the longitudinal direction of the spring devices connected to the third and fourth edges is arranged parallel to the imaginary connecting line between the holding-element-side connection points of the connection units connected to the first edge and parallel to the imaginary connecting line between the holding-element-side connection points of the connection units connected to the second edge.

The imaginary connecting line between the spring device connected to the third edge and the spring device connected to the fourth edge runs preferably through the passage hole in the holding element, in particular through the central point thereof.

In a second particular preferred embodiment, it is provided that the holding element is fastened exclusively at the first and second edges to the frame, by means of two or at least two connection units arranged spaced apart from one another. By contrast to the first particularly preferred embodiment, it is the case in the second particularly preferred embodiment that there are no spring devices at other edges, in particular at the third and fourth edges. The fastening of the holding element is thus realized only at the first and second edges.

The holding element is preferably formed by a plate which is square or rectangular as seen in plan view. The plate plane is preferably arranged at an angle with respect to the frame plane or plane of the frame interior.

The third and fourth edges are preferably arranged perpendicular to the first and second edges.

With the above and other objects in view there is also provided, in accordance with the invention, a building with such a leadthrough device installed in a wall opening of the building wall. The leadthrough device holds a conduit that is led through the wall opening. According to the invention, the leadthrough device is designed as described above. With regard to the advantages and advantageous embodiments of the building according to the invention, the explanations given above in conjunction with the leadthrough device according to the invention and the advantageous embodiments thereof apply correspondingly. The led-through conduit is preferably an electrical conduit.

Other features which are considered as characteristic for the invention are set forth in the appended claims.

Although the invention is illustrated and described herein as embodied in a leadthrough device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

In the figures, for the sake of clarity, the same reference designations are always used for identical or similar components.

DETAILED DESCRIPTION OF THE INVENTION

Figure 1:
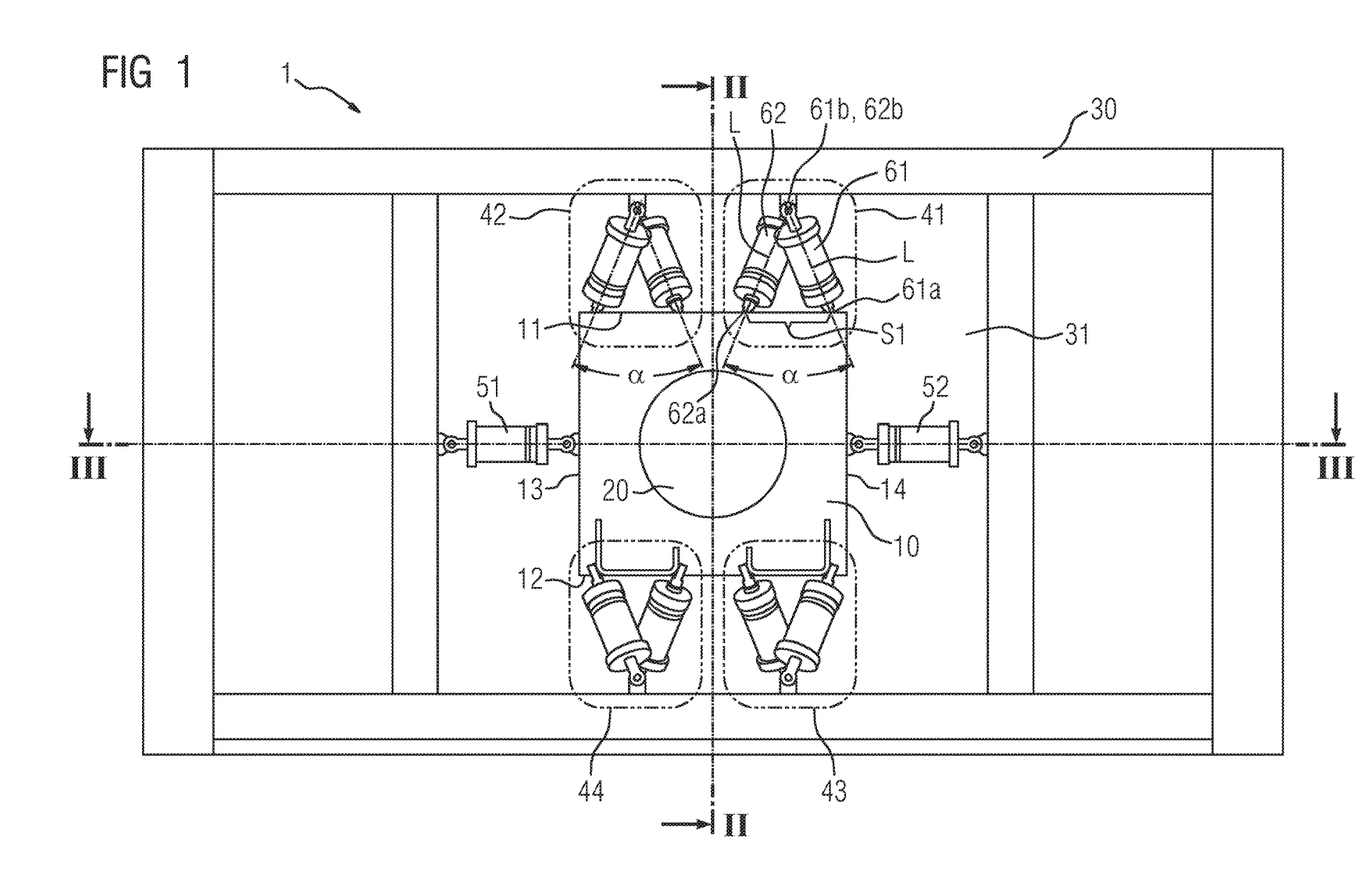
FIG. 1 shows a plan view of a first exemplary embodiment of a leadthrough device which is suitable for holding an electrical conduit in a wall opening of a wall.

Referring now to the figures of the drawing in detail and first, particularly, to FIG. 1 thereof, there is shown a leadthrough device 1 which is suitable for holding an electrical conduit (cf. FIG. 4) in a wall opening of a wall. The leadthrough device 1 comprises a holding element 10 which is equipped with a passage hole 20. The electrical conduit can be led through the passage hole 20; said electrical conduit would, in the illustration as per FIG. 1, extend through the passage hole 20 perpendicularly with respect to the plane of the image, i.e., into and out of the image.

The holding element 10 is held resiliently in a frame interior 31 of an outer frame 30 of the leadthrough device 1. The frame 30 is suitable for being installed in a wall opening, and is designed correspondingly at the outer edge.

In the exemplary embodiment as per FIG. 1, four connection units 41, 42, 43, 44 and two individual spring devices 51 and 52 are provided for holding the holding element 10 in resilient fashion within the frame interior 31.

The four connection units 41, 42, 43 and 44 are preferably structurally identical; the statements made below regarding an advantageous construction of the connection unit 41 thus apply correspondingly to the connection units 42, 43 and 44.

In FIG. 1, it can be seen that the connection unit 41 comprises two adjacent spring devices 61 and 62, which form an angled spring device pair. The angle α between the longitudinal directions L of the two adjacent spring devices 61 and 62 of the connection unit 41 is preferably 45° or approximately 45°.

The two adjacent spring devices 61 and 62 are fastened in each case by means of a first end 61a and 62a respectively to the holding element 10 and by means of their second end 61b and 62b respectively to the frame 30.

FIG. 1 furthermore shows that the two first ends 61a and 62a of the two spring devices 61 and 62 are spaced apart from one another and define a first distance S1. The distance S1 or the direction vector thereof lies in the frame plane of the frame 30 or in the plane of the frame interior 31.

The two second ends 61b and 62b of the two spring devices 61 and 62 are likewise spaced apart from one another and form a second distance, which runs perpendicular to the plane of the image in FIG. 1 and, for this reason, is not visible in FIG. 1.

Figure 2:
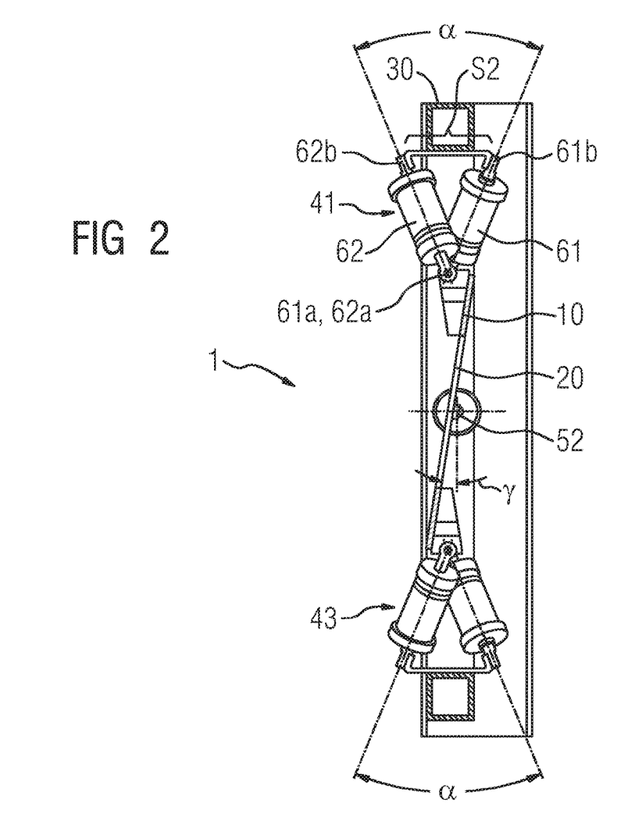
FIG. 2 shows the leadthrough device as per FIG. 1 in a cross section.

FIG. 2 shows the leadthrough device 1 in a cross section along the section line II-II. It is possible to see the connection unit 41 with the two spring devices 61 and 62 already discussed in conjunction with FIG. 1. As already discussed in conjunction with FIG. 1, the two adjacent spring devices 61 and 62 are arranged at an angle with respect to one another, specifically such that the angle between the longitudinal directions L of the two adjacent spring devices 61 and 62 of the connection unit 41 is 45° or at least approximately 45°. The arrangement of the spring devices 61 and 62 has the effect that the longitudinal directions L of the two spring devices each extend out of the frame plane of the frame 30 in angled fashion in opposite directions. For this reason, the second ends 61b and 62b of the two spring devices 61 and 62 are situated on different sides outside the frame plane and form a second distance S2, the direction vector of which is perpendicular or at least approximately perpendicular to the frame plane of the frame 30, and thus perpendicular or at least approximately perpendicular to the direction vector of the first distance S1 (cf. FIG. 1).

It can furthermore be seen from FIG. 2 that the holding plate 10 is formed preferably by a plate, the plate plane of which does not imperatively lie in the frame plane of the frame 30 or parallel to the frame plane. Rather, it is advantageous if the plate plane of the holding element 10 lies at an angle with respect to the frame plane (cf. angle γ).

Returning once more to FIG. 1, the four connection units 41 to 44 are preferably arranged in pairs, specifically such that two of the connection units, specifically the connection units 41 and 42, connect a first edge 11 of the holding element 10 to the frame 30, and the two connection units 43 and 44 connect the opposite, second edge 12 of the holding element 10 to the frame 30.

The individual spring devices 51 and 52 connect in each case a third edge 13 and a fourth edge 14, which is situated opposite the third edge 13, to the frame 30.

The spring devices 61 and 62 of the four connection units 41-44 and the two individual spring devices 51 and 52 are preferably axial annular springs.

If the holding element 10 is formed by a plate, as shown in conjunction with FIG. 2, then it is advantageous for the plate to be square or rectangular and for the third and fourth edges 13 and 14 respectively to be arranged perpendicular to the first and second edges 11 and 12 respectively. The imaginary connecting line between the spring device 51 connected to the third edge 13 and the spring device 52 connected to the fourth edge 14 runs preferably through the passage hole 20 in the holding element 10, particularly preferably through the central point thereof.

It is furthermore advantageous if the longitudinal direction of the spring devices 51 and 52 connected to the third and fourth edges 13 and 14 respectively is both parallel to the imaginary connecting line between the holding-element-side connection points of the connection units 41 and 42 connected to the first edge 11 and parallel to the imaginary connecting line between the holding-element-side connection points of the connection units 43 and 44 connected to the second edge 12.

Figure 3:
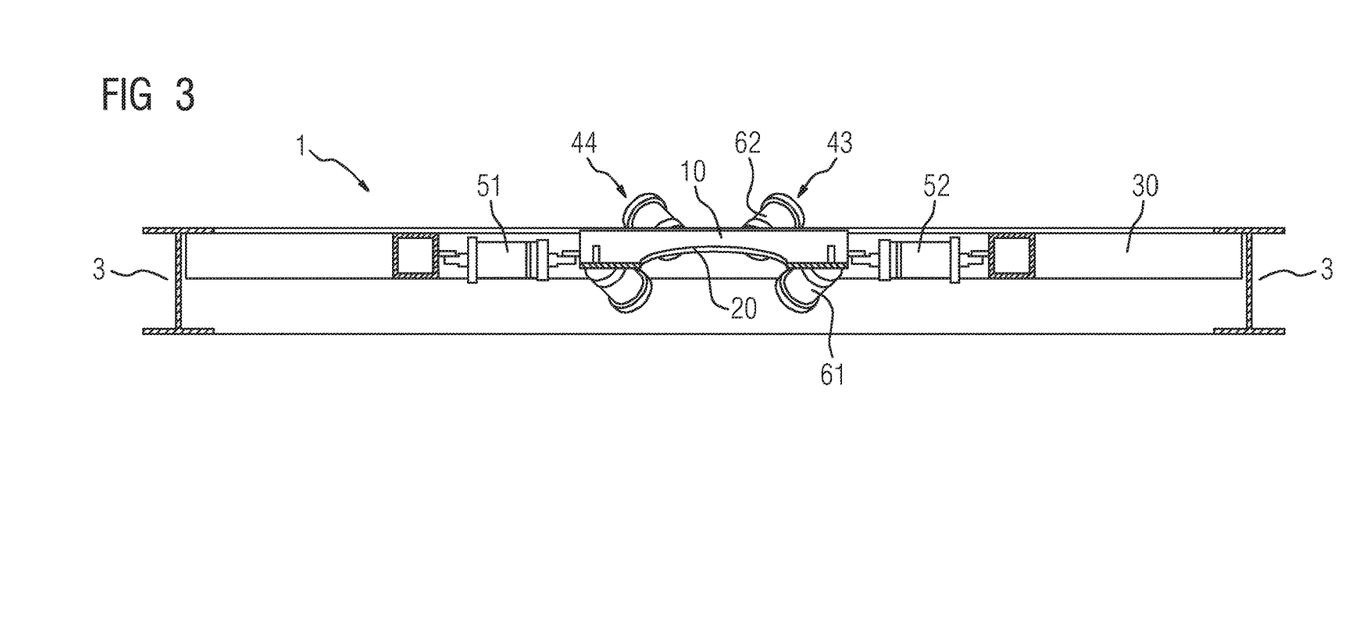
FIG. 3 shows the leadthrough device as per FIG. 1 in another cross section.

FIG. 3 shows the leadthrough device 1 according to FIGS. 1 and 2 once again in another section along the section line III-III as per FIG. 1. It is possible to see the two connection units 43 and 44, which hold the second edge 12 on the frame 30, and the two individual spring devices 51 and 52, the longitudinal directions of which are arranged coaxially on a line which lies in the frame plane of the frame 30.

Figure 4:
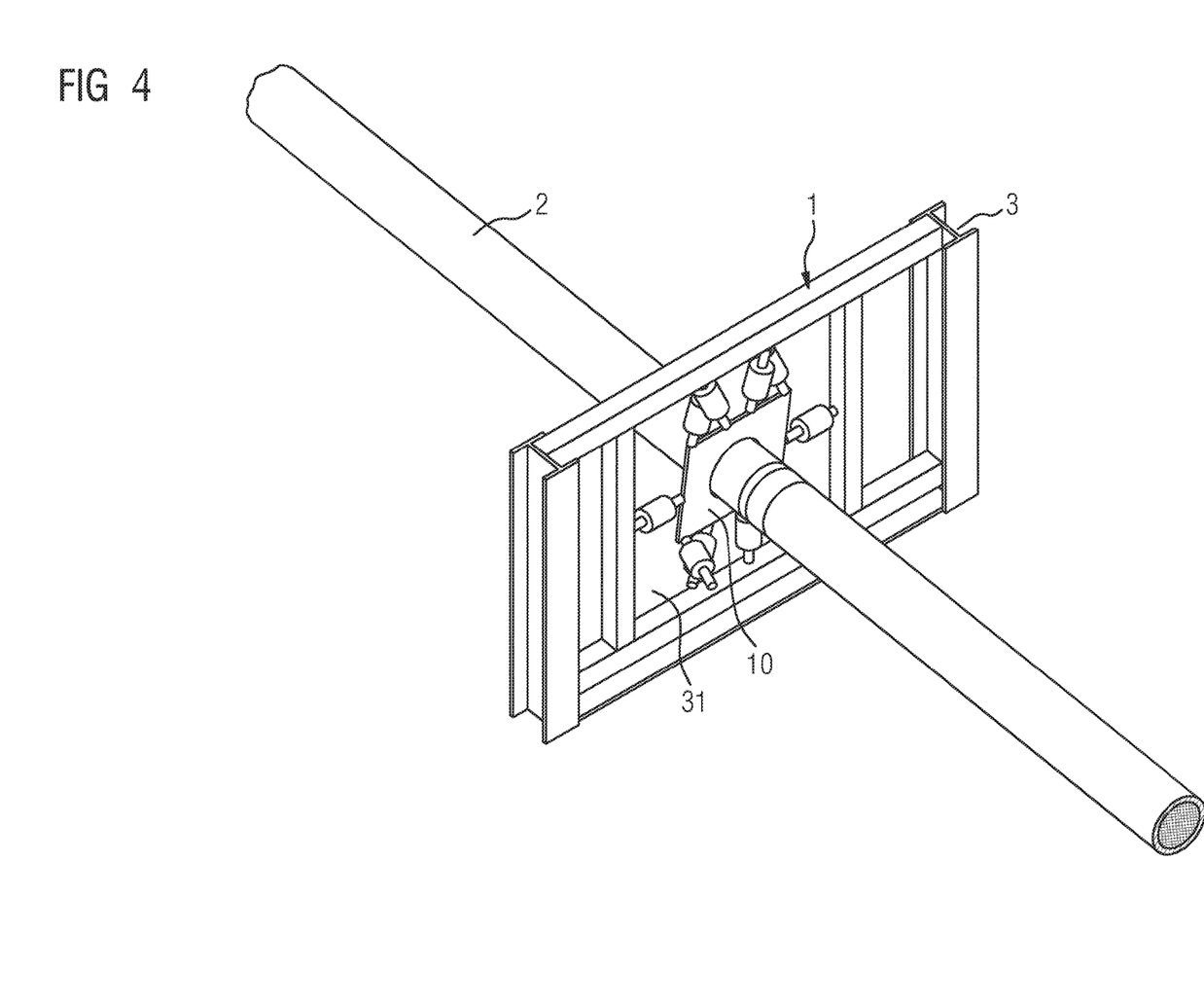
FIG. 4 shows the leadthrough device as per FIGS. 1 to 3 in a three-dimensional illustration obliquely from the side after an electrical conduit has been led through a holding element of the leadthrough device.

FIG. 4 shows the leadthrough device 1 as per FIGS. 1 to 3 in a three-dimensional illustration obliquely from the side, after an electrical conduit 2 has been led through the passage hole 20 in the holding element 10. In the event of vibrations or movements, be they of the electrical conduit 2 or of a wall 3, in particular of a building wall that bears the leadthrough device 1, relative movements between the wall 3 and the electrical conduit 2 can be compensated by means of the spring devices that resiliently hold the holding element 10 in the frame interior 31.

Figure 5:
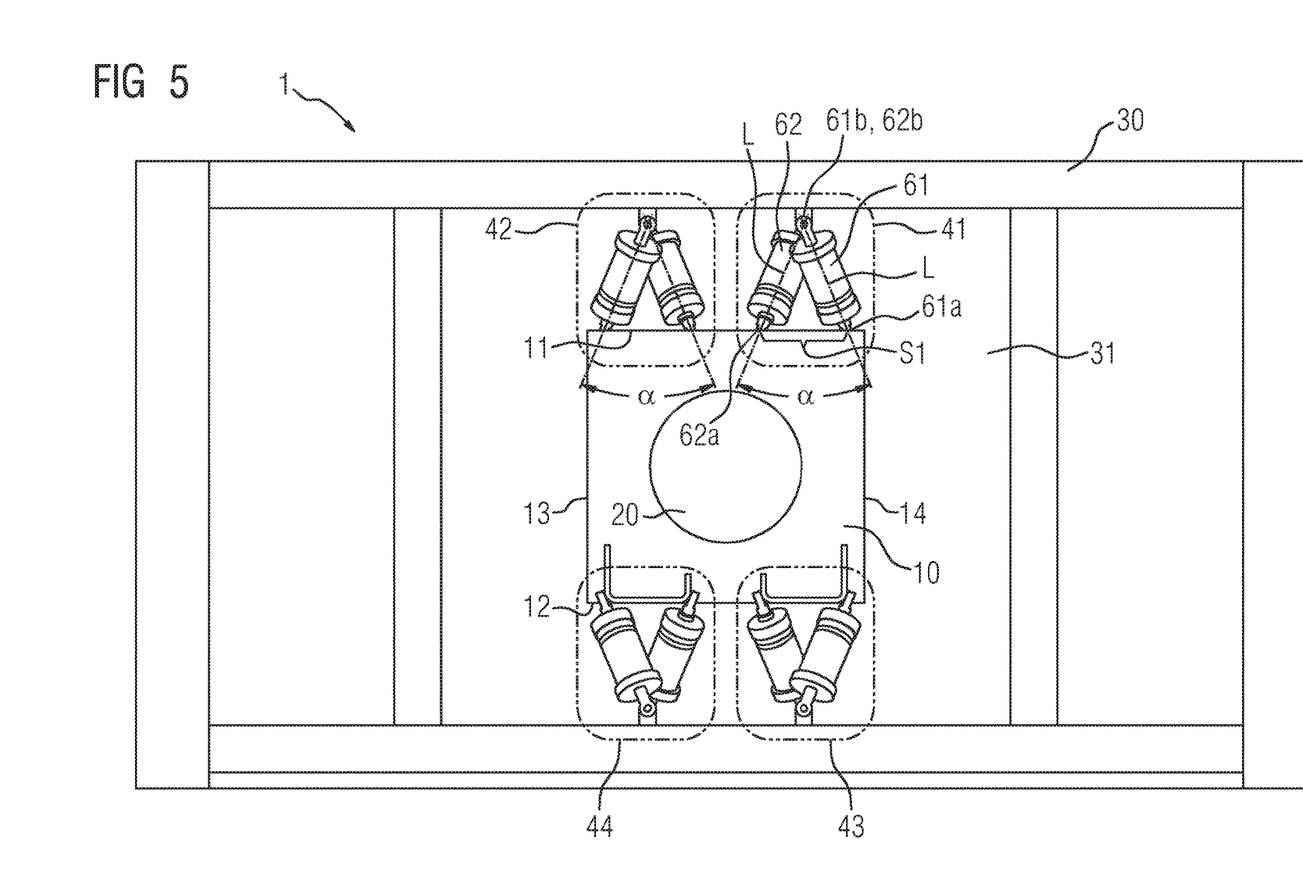
FIG. 5 shows a second exemplary embodiment of a leadthrough device according to the invention.

FIG. 5 shows a second exemplary embodiment of a leadthrough device 1 which is suitable for holding an electrical conduit in a wall opening of a wall 3 (cf. FIG. 4). The leadthrough device 1 as per FIG. 5 corresponds substantially to the leadthrough device 1 that has been discussed above in conjunction with FIGS. 1 to 4. By contrast to the exemplary embodiment as per FIGS. 1 to 4, it is the case in the leadthrough device 1 as per FIG. 5 that only connection units 41-44 with in each case two adjacent spring devices are provided for holding the holding element 10 within the frame interior 31. Individual spring devices 51 and 52 at the third edge 13 and fourth edge 14 are omitted in the case of the leadthrough device 1. The arrangement and function of the four connection units 41 to 44 are identical to the arrangement and function of the four connection units 41 to 44 in the case of the leadthrough device 1 as per FIGS. 1 to 4, such that reference is made to the statements above, which apply correspondingly here.

Even though the invention has been illustrated and described in more detail on the basis of preferred exemplary embodiments, the invention is not restricted by the disclosed examples, and other variations may be derived herefrom by a person skilled in the art without departing from the scope of protection of the invention.

The following is a summary list of reference numerals and the corresponding structure used in the above description of the invention:

1 Leadthrough device
2 Conduit
3 Wall
10 Holding element, holding plate
11 Edge
12 Edge
13 Edge
14 Edge
20 Passage hole
30 Frame
31 Frame interior
41 Connection unit
42 Connection unit
43 Connection unit
44 Connection unit
51 Spring device
52 Spring device
61 Spring device
61*a* End
61*b* End
62 Spring device
62*a* End
62*b* End
L Longitudinal direction
S1 Distance
S2 Distance
α Angle
γ Angle

The invention claimed is:

1. A leadthrough device for holding a conduit in a wall opening of a wall, the leadthrough device comprising:
   a holding element formed with a passage hole for guiding the conduit therethrough;
   an outer frame having a frame interior; and
   at least two spring devices being annular springs disposed to resiliently hold said holding element in said frame interior of said outer frame, wherein two adjacent said spring devices form a connection unit, and wherein each of said two spring devices has a first end fastened to said holding element and a second end fastened to said frame.

2. The leadthrough device according to claim 1, wherein said outer frame is configured for mounting in a building wall.

3. The leadthrough device according to claim 1, wherein an angle between longitudinal directions of two mutually adjacent spring devices of said connection unit lies between 40° and 50°.

4. The leadthrough device according to claim 3, wherein the angle between the longitudinal directions is 45°.

5. The leadthrough device according to claim 1, wherein said spring devices are spring devices that are axially resilient along a longitudinal direction thereof.

6. The leadthrough device according to claim 1, wherein:
   said first ends of said two spring devices are spaced apart from one another to define a first spacing distance; and
   said second ends of said two spring devices are spaced apart from one another to define a second spacing distance; and
   an angle between direction vectors of said first and second spacing distances lies between 80° and 110°.

7. The leadthrough device according to claim 6, wherein the angle between said direction vectors that define the direction of said first and second spacing distances is 90 degrees.

8. The leadthrough device according to claim 6, wherein the first spacing distance is arranged in, or is parallel to, a frame plane of said frame.

9. The leadthrough device according to claim 6, wherein said second spacing distance is perpendicular to a frame plane of said frame.

10. The leadthrough device according to claim 1, wherein said holding element has at least one edge fastened to said frame by way of two or more connection units that arranged spaced apart from one another.

11. The leadthrough device according to claim 1, wherein:
    said holding element is fastened exclusively at two opposite edges to said frame; and
    said passage hole is formed between said two opposite edges.

12. The leadthrough device according to claim 11, wherein said holding element is fastened at each of the two opposite edges by two or more connection units arranged spaced apart from one another.

13. The leadthrough device according to claim 1, wherein said holding element is fastened at two mutually opposite edges, the mutually opposite edges being first and second edges, to said frame, in each case by two or more connection units that are spaced apart from one another.

14. The leadthrough device according to claim 13, wherein:
said holding element is fastened at two further mutually opposite edges, the further mutually opposite edges being third and fourth edges, to said frame, in each case by a single spring device; and
a longitudinal direction of each said spring devices connected to said third and fourth edges is parallel to an imaginary connecting line between holding-element-side connection points of said connection units that are connected to said first edge and parallel to an imaginary connecting line between holding-element-side connection points of said connection units that are connected to said second edge.

15. A leadthrough device for holding a conduit in a wall opening of a wall, the leadthrough device comprising:
a holding element formed with a passage hole for guiding the conduit therethrough;
an outer frame having a frame interior; and
at least one spring device disposed to resiliently hold said holding element in said frame interior of said outer frame, wherein:
said holding element is a square or rectangular plate in plan view; and
a plate plane of said plate is arranged at an angle with respect to said frame plane.

16. A building, comprising:
a building wall having an opening formed therein;
a leadthrough device installed in said wall opening of said building wall, said leadthrough device including:
a holding element formed with a passage hole for guiding a conduit therethrough;
an outer frame having a frame interior; and
at least one spring device disposed to resiliently hold said holding element in said frame interior of said outer frame; and
a conduit held by said leadthrough device and guided through said wall opening.

* * * * *